(12) United States Patent
Rits

(10) Patent No.: US 7,797,534 B2
(45) Date of Patent: Sep. 14, 2010

(54) CONTROLLED PATH-BASED PROCESS EXECUTION

(75) Inventor: Maarten E. Rits, Nice (FR)

(73) Assignee: SAP AG, Walldorf (DE)

( * ) Notice: Subject to any disclaimer, the term of this patent is extended or adjusted under 35 U.S.C. 154(b) by 1000 days.

(21) Appl. No.: 11/583,323

(22) Filed: Oct. 19, 2006

(65) Prior Publication Data

US 2007/0094349 A1    Apr. 26, 2007

(30) Foreign Application Priority Data

Oct. 20, 2005    (EP)    ............................ 05292211

(51) Int. Cl.
*H04L 29/06* (2006.01)
*G06F 15/16* (2006.01)
(52) U.S. Cl. ...................... 713/156; 709/217
(58) Field of Classification Search .............. 713/157
See application file for complete search history.

(56) References Cited

U.S. PATENT DOCUMENTS

| 7,356,692 | B2* | 4/2008 | Bialick et al. ............... 713/156 |
| 2002/0066080 | A1 | 5/2002 | O'Dowd |
| 2004/0078547 | A1 | 4/2004 | David et al. |

FOREIGN PATENT DOCUMENTS

| EP | 1031908 | 8/2000 |
| EP | 969366 | 1/2005 |
| EP | 1507185 | 2/2005 |

OTHER PUBLICATIONS

Kim et al., "Ticket-based Fine-Grained Authorization Service in the Dynamic VO Environment", Oct. 29, 2004, ACM Workshop on Secure Web Services, pp. 29-36.*
Kim et al., "Workflow-based Authorization Service in Grid",2003, IEEE Computer Society, pp. 1-7.*
Koshutanski et al., "An Access Control Framework for Business Processes for Web Services", Oct. 31, 2003, ACM Workshop on XML Security, pp. 15-24.*
Zhang et al., "Dynamic Context-aware Access Control for GRID Applications",2003, IEEE Computer Society, pp. 1-8.*
"Search Report for Application No. 05292211.9", (Mar. 20. 2006).
Thompson, "Certificate-based authorization policy in a PKI environment", *ACM Transactions on Information and System Security*, 6(4), ISSN:1094-9224,(Nov. 2003),566-588.

* cited by examiner

*Primary Examiner*—Matthew B Smithers
(74) *Attorney, Agent, or Firm*—Schwegman, Lundberg & Woessner, P.A.

(57) ABSTRACT

There is proposed a method for executing a workflow, comprising providing the workflow comprising process level activities, at least one process level activity being able to access system resources, the access to the system resources being mediated by a plurality of backend modules. A backend module of the plurality of backend modules carries out the steps of receiving a hierarchical attribute certificate, validating the attribute certificate, checking whether the attribute certificate grants a right to execute the backend module, checking whether a predefined execution path from the process level activity to the backend module has been traversed, and if both checking steps are successful, executing the backend module. Moreover, there is proposed a respective device, computer program medium and computer program product.

15 Claims, 8 Drawing Sheets

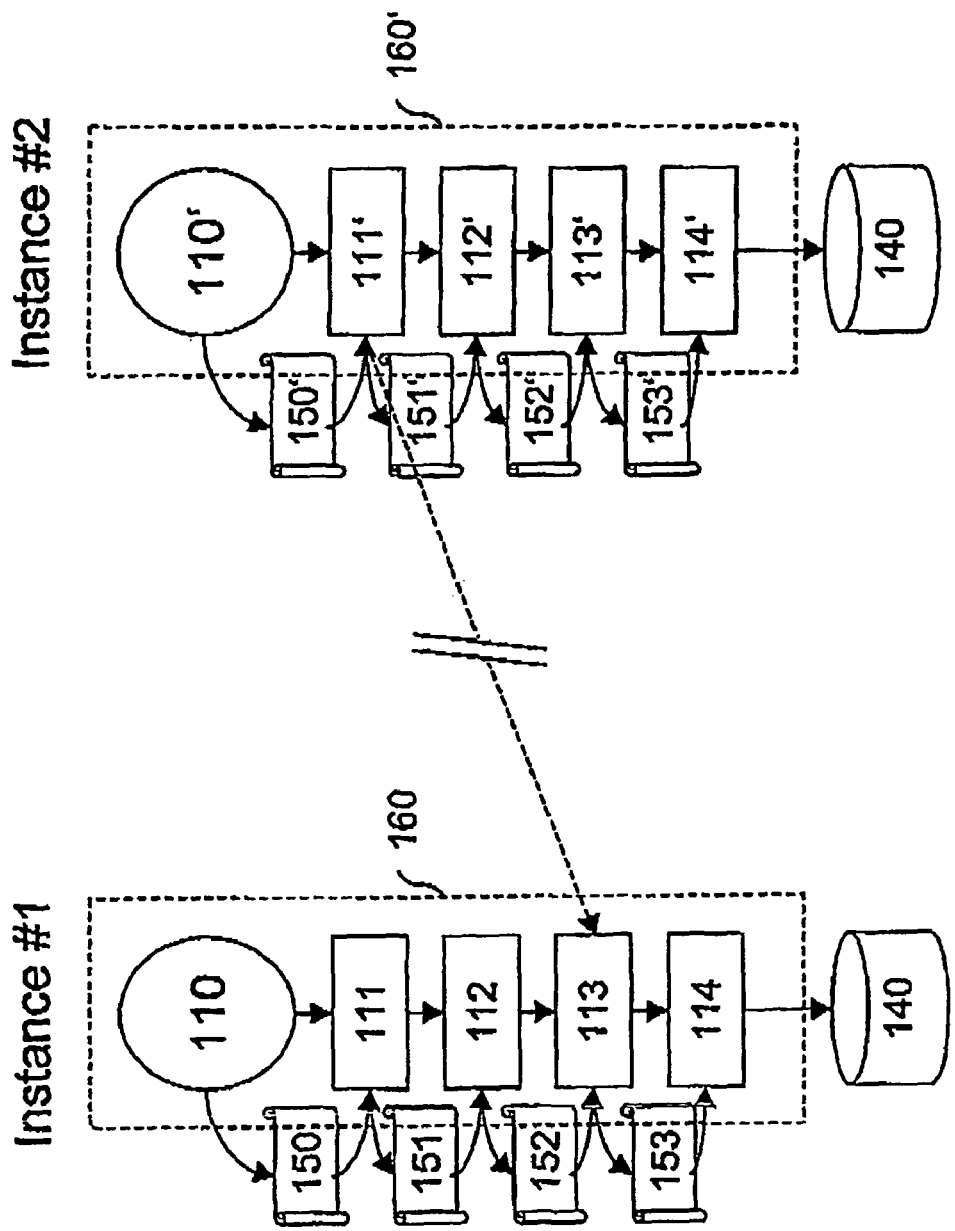

Fig. 8

```
try {
        // load the request for this test
        RequestCtx request =
              RequestCtx.getInstance(new FileInputStream(testPrefix +
                                            name + "Request.xml"));

// re-set the module to use this test's policies
        if (policies == null) {
              module.setPolicies(testPrefix + name + "Policy.xml");
        } else {
              Iterator it = policies.iterator();
              Set set = new HashSet();

while (it.hasNext())
                    set.add(testPrefix + (String)(it.next()));

module.setPolicies(set);
        }

// re-set any references we're using
        module.setPolicyRefs(policyRefs, testPrefix);
        module.setPolicySetRefs(policySetRefs, testPrefix);

// actually do the evaluation
        ResponseCtx response = pdp.evaluate(request);

if (response == true) {
              if ((component.getType()).equals("DBConnector")) {
                    getLocalAuditLog().storeEvent(getCertificate(),
801                                          getTime(), getProcessID());
              }
              else {
                    AttributeCertificate cert = new AttributeCertificate(
802                        getCertificate(), getContext(), getPrivateKey());
                    getProcessContext().add(cert);
                    component.executeMethod(args);
              }
        }
        else {
              throw AuthorizationException("Not Authorized");
803           getLocalAuditLog().storeEvent(denied, getCertificate(),
                                            getTime(), getProcessID());
        }
}
```

CONTROLLED PATH-BASED PROCESS EXECUTION

CLAIM OF PRIORITY

The present patent application claims the priority benefit of the filing date of European Application (EPO) No. 05292211.9 filed Oct. 20, 2005, the entire content of which is incorporated herein by reference.

TECHNICAL FIELD

The present application relates to the field of access control in computer systems communication, and in particular, systems and methods for controlled path-based process execution in computer systems.

TECHNICAL BACKGROUND

When implementing a workflow on top of existing applications, for example legacy software, e.g. in the banking sector, there exists the requirement of full traceability of user actions in business processes that execute on top of a complex system of multiple backend components (cf. the Basel II accord).

Traceability means that certain events should not only be logged, they should also be non-repudiably logged and even more important, one should be able to backtrack every event to the user who originally launched that event.

In multi-layered systems with technical users, implementing traceability is not straightforward. A technical user is a piece of application logic that has the necessary rights to access (almost) all of the underlying resources. One example is a connection to a database with administrator rights. Access control to the underlying resources, for example the database tables, is then managed by controlling access to the technical user. The access control is thus shifted to a higher layer.

One possibility to implement the traceability requirement may be to pass the user context information as a variable between different processes. In other words, when an event occurs in the underlying resources, the technical user is logged, no information about the user who triggered the technical user is stored. This could be solved, at first sight, by passing the user as a parameter when calling the technical user, both the technical user and the user who triggered the technical user have to be transferred to achieve full traceability.

This may solve the basic traceability requirement, and may be the solution requiring the least effort. However, development resources may be required to adapt the whole code base.

Another possibility may be to inspect all exchanged messages and to store the relevant ones in an audit log. However, this incurs a run-time performance overhead to the application execution time. The advantage is that no adaptations at the code level are necessary.

Access control with certificates has been studied in the Akenti project (http://www-itg.lbl.gov/Akenti).

SUMMARY

According to an aspect there is for example proposed a method for executing a workflow, the method comprising:
Providing the workflow comprising process level activities, at least one process level activity being able to access system resources, the access to the system resources being mediated by a plurality of backend modules, wherein a backend module of the plurality of backend modules may carry out the steps of:
receiving a hierarchical attribute certificate;
validating the attribute certificate;
checking whether the attribute certificate grants a right to execute the backend module;
checking whether a predefined execution path from the process level activity to the backend module has been traversed; and
if both checking steps are successful, executing the backend module.

Access to underlying components will only be possible if the event has been triggered from a predefined path starting from (business) process level activity on the highest level. This way, circumvention of access control to resources can be avoided.

In a further example of a method for executing a workflow, the attribute certificate may have been issued by the at least one process level activity.

In another example of a method for executing a workflow, the backend module may be a first backend module and the first backend module may further delegate the rights embedded in the attribute certificate to a second backend module by issuing a second attribute certificate.

In still another example of a method for executing a workflow, the first backend module may further issue a second attribute certificate, the second attribute certificate being based on the attribute certificate and comprising additional information added by the first backend module representing the fact that the first backend module has been executed, in a non-repudiable way.

In a further example of a method for executing a workflow, the first backend module may further sign the information representing the fact that the first backend module has been executed with a private key associated with the first backend module.

In another example of a method for executing a workflow, the first backend module may further add actual context information to the attribute certificate as attributes in order to issue the second attribute certificate.

In a further example of a method for executing a workflow, the actual context information may comprise the time of execution of the first backend module.

In a further example of a method for executing a workflow, a backend module of the plurality of backend modules being the last backend module in the predetermined execution path and being able to access the system resources may make a last attribute certificate being the attribute certificate received by the last backend module persistent in an audit log.

The certificate is used as a system trace, it stores all user/context information in a non-repudiable way, therefore providing full traceability of events. In an example of a device for executing a workflow, the device comprising system resources and a plurality of backend modules, the workflow comprising process level activities, at least one process level activity being able to access the system resources, the access to the system resources being mediated by the plurality of backend modules, a backend module of the plurality of backend modules may comprise:
a receiving component for receiving a hierarchical attribute certificate;
a validating component for validating the attribute certificate;
a right checking component for checking whether the attribute certificate grants a right to execute the backend module;

a path checking component for checking whether a predefined execution path from the process level activity to the backend module has been traversed; and a decision component for deciding whether the results of the right checking component and the path checking component are successful.

In another example of a device for executing a workflow, the backend module may be a first backend module, the first backend module further comprising a delegating component for delegating the rights embedded in the attribute certificate to a second backend module by issuing a second attribute certificate.

In a further example of a device for executing a workflow, the first backend module may further comprise an information adding component for adding information to the attribute certificate in order to issue a second attribute certificate, the second attribute certificate being based on the attribute certificate and comprising additional information representing the fact that the first backend module has been executed, in a non-repudiable way.

In a further example of a device for executing a workflow, the first backend module may further comprise a signing component for signing the information representing the fact that the first backend module has been executed with a private key associated with the first backend module.

In another example of a device for executing a workflow, the first backend module may further comprise a context adding component for adding actual context information to the attribute certificate as attributes in order to issue the second certificate.

Another example of a device for executing a workflow, the device may further comprise a last backend module of the plurality of backend modules being the last backend module in the predetermined execution path and being able to access the system resources, wherein the last backend module may comprise an audit generating component for making last attribute certificate being the attribute certificate received by the last backend module persistent in an audit log.

An example of a computer-readable storage medium may store a computer program containing computer readable instructions which, when loaded and executed in a suitable computer or computer network environment, perform a method for executing a workflow as described above.

An example of a computer program product may contain computer readable instructions which, when loaded and executed in a computer or computer network environment, perform for executing a workflow as described above.

SHORT DESCRIPTION OF THE FIGURES

FIG. 7 represents two different instances of an execution path of the workflow depicted in FIG. 6; and FIG. 8 shows how the application code for a policy enforcement point module could be modified in order to implement the above described system.

DETAILED EXEMPLARY DESCRIPTION

Figure 1:
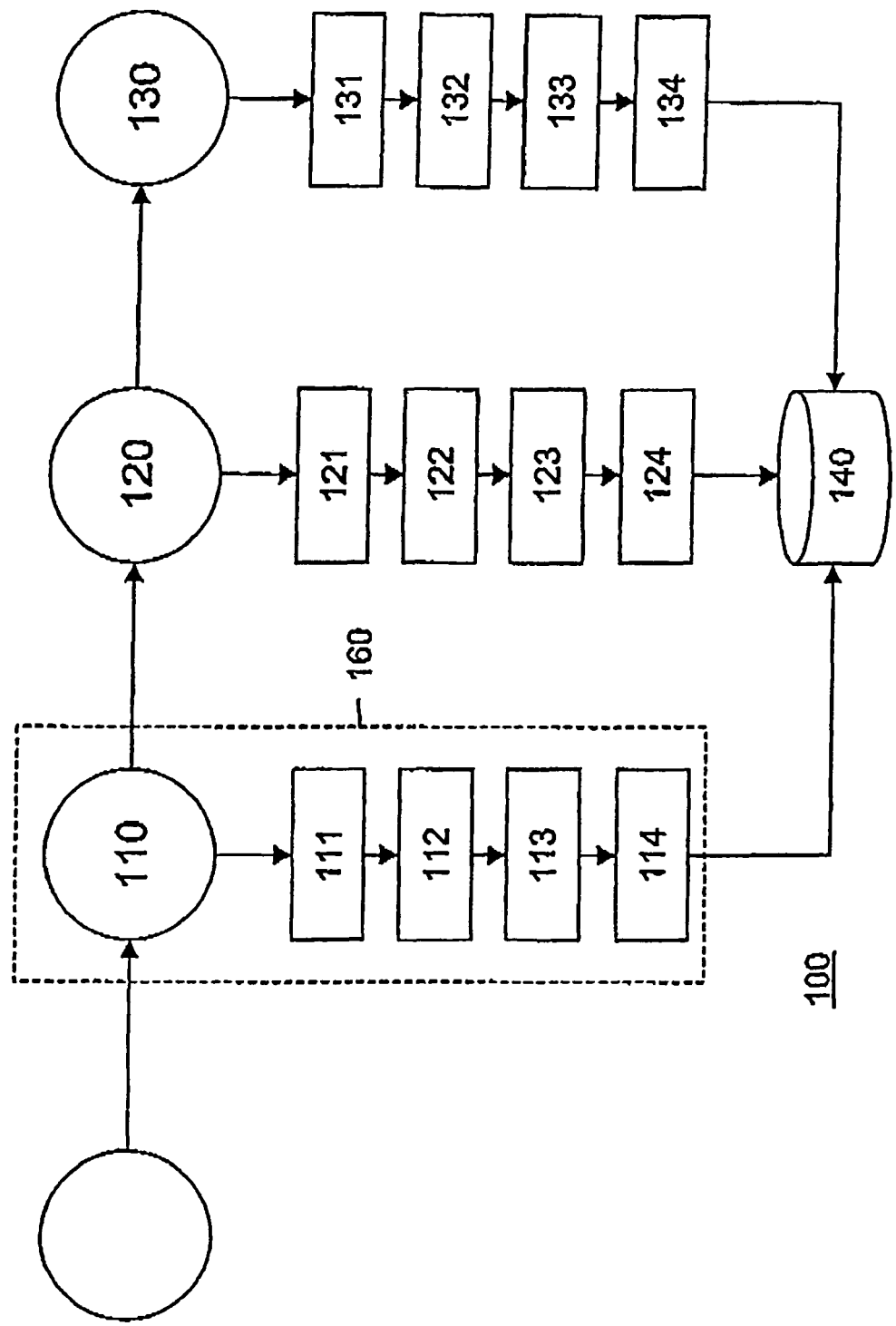
FIG. 1 represents a schematic diagram of the technical structure of a typical banking process.

FIG. 1 is a schematic diagram of the technical structure of a typical banking process.

In FIG. 1, reference signs 110, 120 and 130 denote individual activities (modules or steps) in the control flow at the business process level of process 100. Each activity 110, 120 and 130 may require access to underlying system resources 140, such as a data storage or a stack.

Instead of accessing system resources 140 directly, steps or modules 110, 120, 130 on the business process level make use of backend modules, i.e. intermediate or vertical system components 111, 121, 131, that may themselves call further backend modules 112, 122, 132, etc, until a last backend module 114, 124, 134 may directly access the respective system resource 140.

A sequence of modules from the business process level to the system resource level, as designated by reference 160 in FIG. 1, is termed an execution path. This means that a step or module 110 on the business process level makes access to the system resource 140 by sequentially traversing backend modules 111, 112, 113 and 114.

Figure 2:
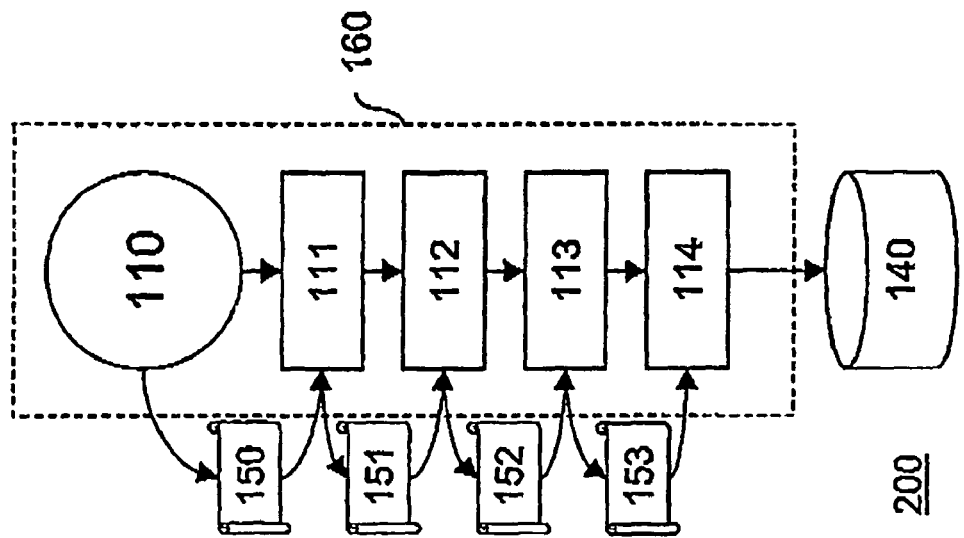
FIG. 2 represents a schematic overview of an execution path within the technical structure of FIG. 1, with delegation of certificates.

FIG. 2 shows the execution path 160 of the structure shown in FIG. 1, in which a hierarchical delegation scheme based on certificates is employed for ensuring that execution paths conform the access constraints of a given system and that access may be traced and documented.

In this particular example, activity 110 in FIG. 2 may issue a hierarchical attribute certificate embedding the rights to access the system resource 140. Activity 110 may be the administrator of the business process that will first issue a certificate containing a hierarchical rights structure to the user that will execute activity 110.

In the execution path 160, at backend module 111, the user may delegate the rights to access backend module 112, consequently 113 and 114 to the technical user. This means that a new certificate will be used that contains the right to access 112, if first 111 has been executed and then consequently 113, 114, if 112 has been executed and so on.

The fact that a certain step in the backend modules 111, 112, 113 and 114 has been executed may be added to the certificate in a non-repudiable way. This may allow validating the fact that a certificate has been delegated in the correct context. It may also prevent that a user can access a backend module without originating from an activity at the process level along the predetermined execution path 160.

The backend modules 111, 112, 113, 114 may all require a private key to sign information about the execution. The fact that the certificates may be issued at each step by a backend module (they may be signed with the private key) and that validation of the whole scheme of certificates, up to the certificate issued at the process level, is necessary to validate the attributes embedded within the certificate (the rights), may represent a guarantee that the correct execution path has been followed. Besides this, the actual context information may be added to each of the certificates as attributes, by the backend module.

It depends on the exact traceability requirements to make a decision on what to store. Examples of possible information include the time of execution, the context variables, and the like. This information may be embedded within the certificate and its integrity is protected by the signature on the certificate.

In the end, when executing the last backend module 114, a certificate may be obtained containing the whole issuing chain (thus also the user who launched the activity 110) and the context under which the execution has been performed. At this lowest level of the last backend module 114, when access to the database 140 is performed, the information contained in the certificate can be made persistent in an audit log. Based on the actual system it may be convenient also to store parts of the system trace directly in the audit log, when the event occurs.

Figure 3:
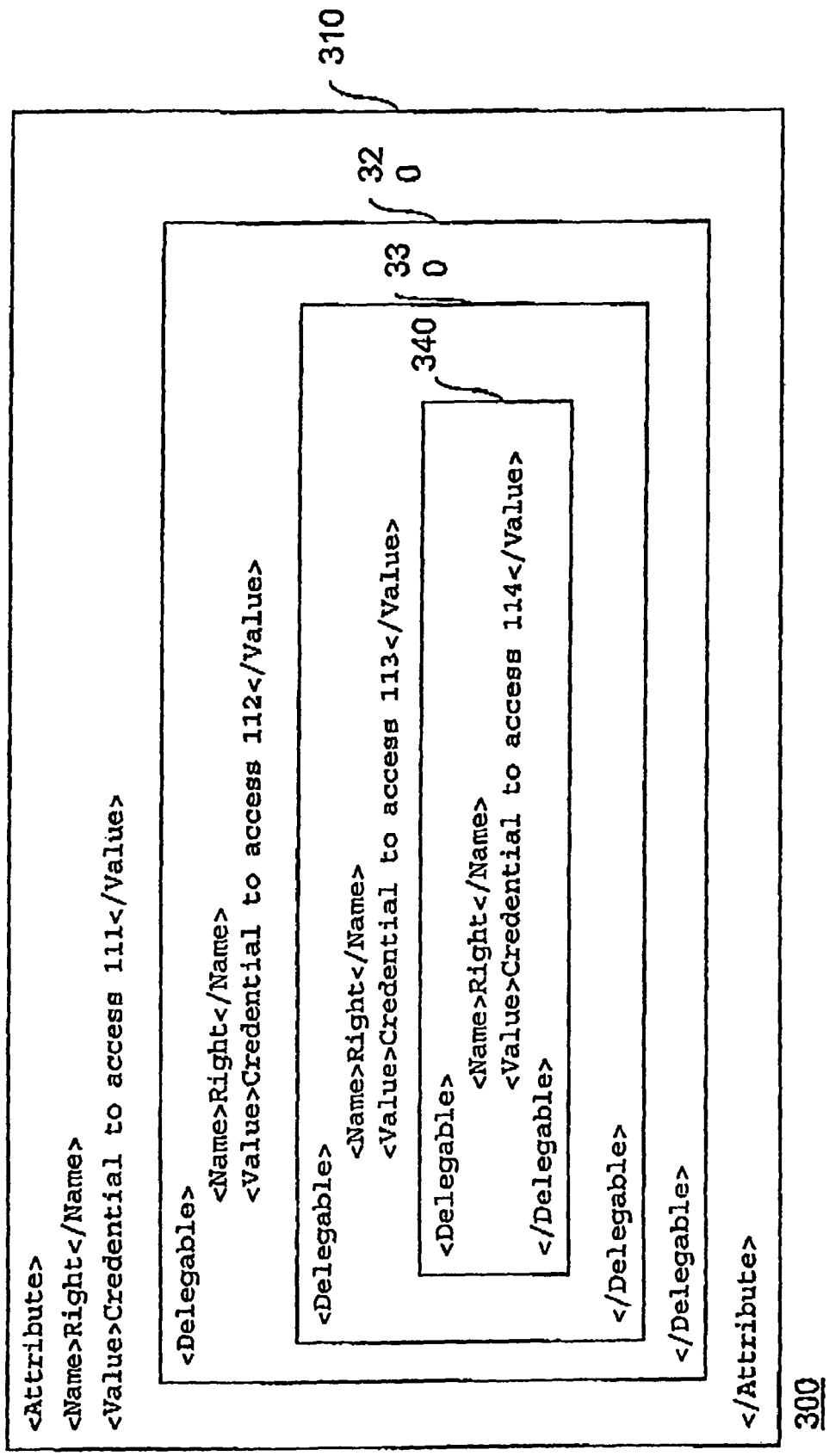
FIG. 3 represents a hierarchical rights structure in an attribute certificate used in the technical structure of FIG. 1.

In order to prevent that a backend component from a process has access to the backend components used by other processes, backend modules may be made certificate-aware. In one example, this may be done by providing the respective functionality in a standard, certificate aware backend module wrapper FIG. 3 shows a hierarchical attribute certificate structure 300 that may be used in the above-described example.

The hierarchical attribute certificate structure 300 comprises hierarchically nested attribute certificates 310, 320, 330 and 340. In other words, any certificate further issued in the chain contains the full issuer certificate, exploiting recursive XML schema capabilities as shown in FIG. 3, thereby yielding self-contained certificates with an explicit trust chain.

In general, a public-key certificate (hereinafter "certificate") binds a public key value to a set of information that identifies the entity (such as person, organisation, account, or site) associated with use of the corresponding private key (this entity is known as the "subject" of the certificate). A certificate is used by a "certificate user" or "relying party" that needs to use, and rely upon the accuracy of, the public key distributed via that certificate (a certificate user is typically an entity that is verifying a digital signature from the certificate's subject or an entity sending encrypted data to the subject). An implementation of certificates is discussed in RFC 2527 ("Internet X.509 Public Key Infrastructure, Certificate Policy and Certification Practices Framework"), incorporated herewith in its entirety.

Each attribute certificate used in the previously described methods and devices carries an attribute defining a right to access specific a backend module having the following form:

<Name>Right</Name>
<Value>Credential to access 113</Value>

In other words, these attributes reflect security credentials of a particular user and are defined in terms of a name and a value.

In general, an attribute certificate is a certificate that asserts something about its subject, namely, that the subject possesses the named attribute. In the attribute certificates model as used in the present application, identity and attributes are placed on the same level. All attributes are defined in a uniform and extensible manner, with "identity" being just one like any other attribute.

In other words, a certificate associates attributes to a principal, the holder, with a data structure signed by the certificate issuer; certificate issuer and holder can either be a public key, like in SPKI (discussed in RFC 2693), or a reference to another certificate (for example X.509v3, as discussed in Internet RFC 2527). The signature may make the certificate tamper proof and enables to build a trust chain. The holder proves the ownership of the certificate through a classic challenge-response protocol demonstrating private key ownership.

The issuer may create new attributes or delegate existing attributes, according to the delegation rules; he may also further reduce the right to delegate. Using a public key as holder creates a new, independent attribute certificate from the issuer for the holder; using a reference to an existing certificate permits to associate attributes to existing entities, and can be used to build cross-domain trust chains.

Figure 4:
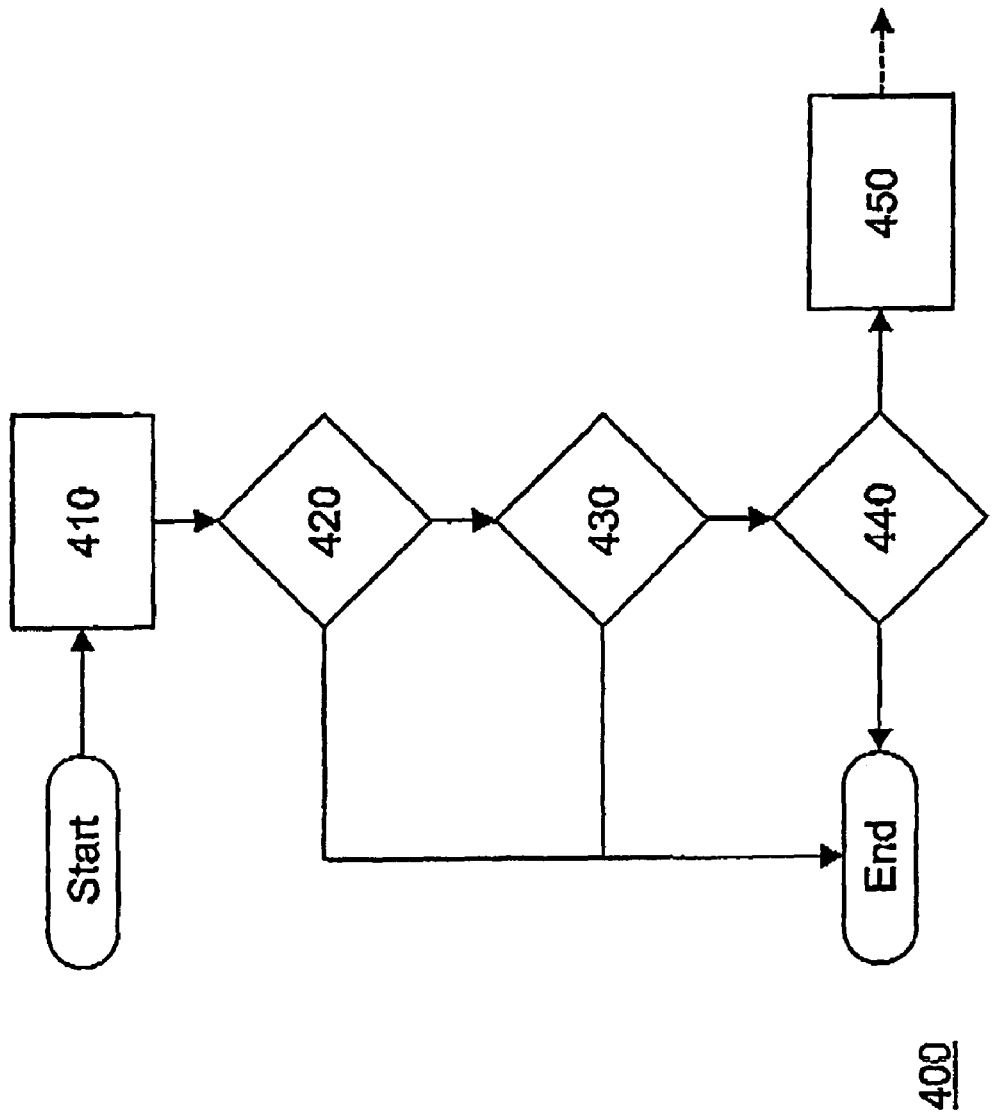
FIG. 4 represents a schematic overview of a method for executing a workflow.

With reference to FIG. 4, it will now be explained in more detail how access from one layer to the next layer may be controlled by using the certificate delegating the necessary rights and the associated certificate chain.

In FIG. 4, step 410 comprises receiving a hierarchical attribute certificate as exemplified in FIG. 3.

Step 420 comprises validating the attribute certificate. Validation may be determined by checking whether the certificate has been issued by a trusted authority or a trusted instance. In case the certificate has been issued by other instances, it is recursively checked whether the right to issue the certificate has ultimately been delegated by a trusted authority or instance. If the certificate has not been issued by a trusted authority or instance or cannot ultimately be traced back to a trusted authority or instance, the execution of the backend module ends. In the opposite case, the execution continues with step 430.

Step 430 comprises checking whether the attribute certificate grants a right to execute the backend module 111, 112, 113 or 114. If it is determined that the certificate grants such a right, the method proceeds with step 440. Otherwise, the method ends. Before ending, the failed check may be recorded in the audit log.

Step 440 comprises checking whether a predefined execution path 160 from the process level activity 110 to the backend module has been traversed. In one example, the predefined execution path 160 may be identical with the hierarchy comprised in the hierarchical attribute certificate, such that present step 440 is identical with the recursive validation of the certificate in step 420.

Step 450 comprises executing the backend module, which is only carried out if both checking steps have been successful.

In further examples of the above-described method, the context of the backend module may be added to the attribute certificate. Access may be granted and the generated attribute certificate may be passed to the next backend module downstream of the predetermined execution path. The new certificate may be signed by the backend module. If the last backend module before the system level has been reached, then the context, together with the certificates, may be stored in the audit log.

Figure 5:
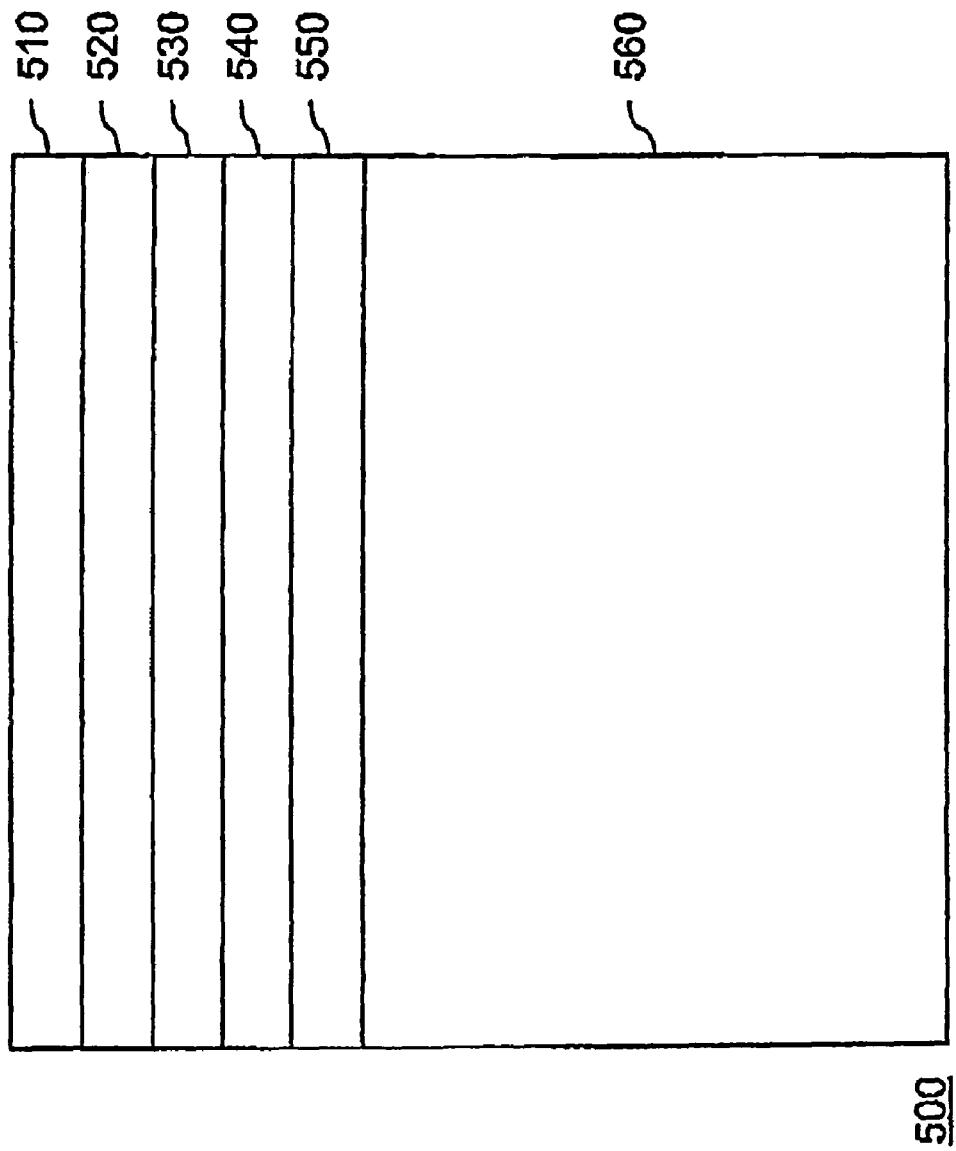
FIG. 5 represents a schematic overview of a device for executing a workflow.

FIG. 5 represents a schematic overview of an example of a backend module 500 comprised in a device for executing a workflow 100.

The backend module 500 is made up of several components. Reference sign 510 designates a receiving component for receiving a hierarchical attribute certificate. Reference sign 520 designates a validating component for validating an attribute certificate. Reference 530 designates a right checking component for checking whether the attribute certificate grants a right to execute the backend module 500. Reference sign 540 designates a path checking component for checking whether a predefined execution path from the process level activity to the backend module has been traversed.

Reference sign 550 designates a decision component for whether the results of the right checking component and the path checking component are successful. If they are, the backend module 500 proceeds in section 560 by executing its functional content.

Figure 6:
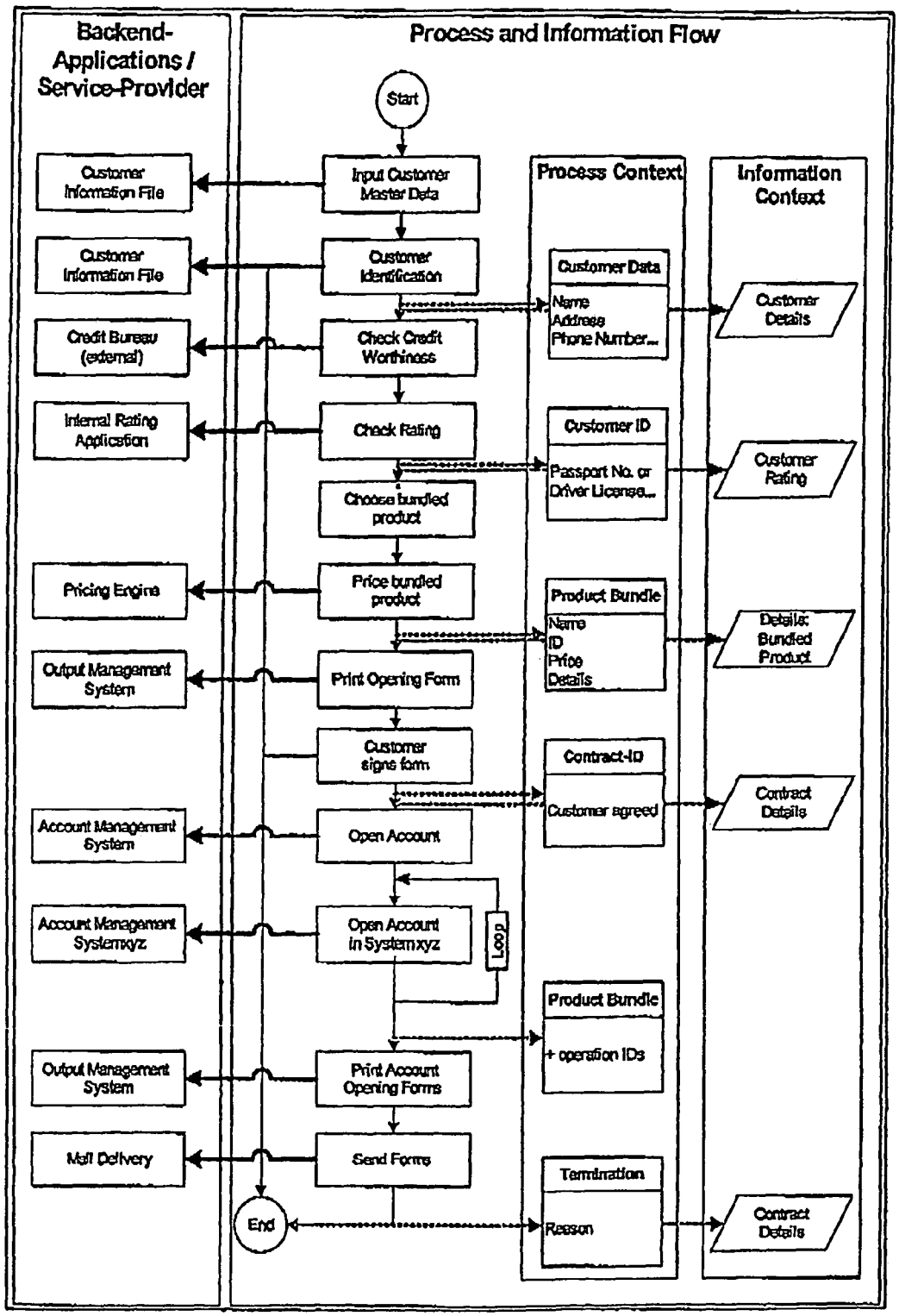
FIG. 6 represents a block diagram of a workflow for managing a life-cycle of a bank loan.

FIG. 6 represents a block diagram of a workflow for managing the life-cycle of a bank loan. The left column (Backend-Applications/Service Provider) lists concrete examples of backend application modules that are used by the depicted workflow. For example, backend application modules for "Customer Information Files", "Credit Bureau (External)" or a "Mail Delivery" are provided.

The second column from the left shows the individual steps of the workflow. The begin of the workflow is depicted by the field "Start" while its end is depicted by the field "End". The individual steps of the process describe the loan origination. Specifically, a specific process is described concerning the management of the life cycle of the loan including on which criteria the loan is approved, the transactions that are being made between the accounts, follow-up payments, etc. Arrows to the left indicate, how the backend application modules are accessed by these individual steps of the workflow.

The third column from the left labelled "Process Context" shows process context information. Arrows from the individual steps of the workflow to specific process context components indicate which of these components are accessed or generated during the individual steps of the workflow. The last column on the right labelled "Information Context" shows an information context. Arrows from the process context components to specific parts of the information context indicated, which of these parts are accessed or generated during the individual steps of the workflow.

FIG. 7 schematically represents two different instances 160, 160' of one execution path of the workflow depicted in FIG. 6.

When the first instance 160 of the loan origination workflow is instantiated, several backend application modules are instantiated for this process. In general, it is undesirable, that one of these backend application modules (like an instance of a payment component for the client's bank account) is used by the second instance of the loan origination workflow 160'.

Such a generally undesirable case is indicated by the dotted line in FIG. 7, where a backend application module 111' of workflow instance 160' is shown to attempt accessing backend application module 113 of the first workflow instance 160 for another customer, so that the first customer is charged for the loan of the second customer. This could be unintentional, a programming error, but it could also be malicious insider fraud. For this, it is desirable to control the access to these components, based on whether the call comes from the correct module instances.

FIG. 8 shows how the application code for a policy enforcement point module can to be modified in order to implement the above described system.

In a service-enabled system landscape, declarative access control enforcement mechanisms are needed. At the implementation level, authorisation decisions may not be coded any longer in the application code directly. Instead, a request may be sent to a PEP (Policy Enforcement Point) module.

Because of the modularity of this solution, the effort for implementing the above-described system may be limited, since only the code of the PEP module may have to be adapted.

In FIG. 8, after loading the request for the execution of a specific backend module, the module is re-set to enforce a predetermined security enforcement policy. Then, a PDP (Policy Decision Point) module is invoked in order to evaluate the present request for access. The PDP module is responsible for validating the certificate transmitted with the request and for making an access control decision based on the current execution path. This may require additional lines of code in the PDP module, which are not shown here.

The changes needed for the PEP module are indicated by the underlining in FIG. 8. If the evaluation of the request is negative, the PEP module throws (Step 803) an Exception ("Not Authorized") that indicates that the request did not carry the proper authorisation.

If the evaluation of the request is positive, it is further determined, whether the last module in the execution path ("DBConnector") has been reached. If the result of this determination is positive, the event, including the certificate, the time and the process ID are stored in the local audit log (Step 801). If it is determined that the present backend application module (component) is not the last in the predetermined execution path, that is, that it does not access the database, then, in step 802, a new attribute certificate ("cert") is generated, based on the present certificate, the context and the private key of the present backend application module, the new certificate is added to the process context and then, the requested method of the backend application module is executed with the provided arguments ("component.executeMethod(args)").

Finally, when implementing a workflow on top of existing applications or when enforcing access control on processes using one or more access control mechanism(s), an automated strategy for extracting the access control of existing applications may be used for extracting access control information for enforcing the appropriate policy on the overall process.

The rights that are needed to execute the backend components of a given process may be extracted by the XacT tool, as described in European Patent Application EP 04 293 112.1, which is hereby incorporated by reference in its entirety. The information delivered by the tool may be used for the access decision rules in order to improve the access control facility.

The hierarchical attribute certificates issued according to the above-described method and device may contain the rights extracted by the XacT tool in such a way that they only can be used if a certain hierarchical path has been traversed during the execution. The trace of the system may be used as input to check whether this specific hierarchical path has been followed or not.

The automated strategy for extracting the access control of existing applications does not need any privileged information on their internal workings (code, specific access control implementations). The automated strategy for extracting the access control of existing applications does further not affect the program itself.

Example embodiments can be implemented in digital electronic circuitry, or in computer hardware, firmware, software, or in combinations of them. The example embodiments can be implemented as a computer program product, for example a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps described herein can be performed by one or more programmable processors executing a computer program to perform functions of the example embodiments by operating on input data and generating output. Method steps can also be performed by, and apparatus of the example embodiments can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the example embodiments can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Embodiments can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the example embodiments, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention claimed is:

1. A method for executing a workflow, implemented on a computer and comprising:
   providing the workflow comprising process level activities, at least one process level activity being able to access system resources, the access to the system resources being mediated by a plurality of backend modules, the plurality of backend modules comprising intermediate system components and a last backend module, wherein the intermediate system components of the plurality of backend modules each carry out:
   receiving a hierarchical public-key attribute certificate embedding the rights to access the system resource;
   validating the attribute certificate;
   checking whether the attribute certificate grants a right to execute a functional content of the backend module;
   checking whether a predefined execution path from the process level activity to the backend module has been traversed;
   if both checking steps are successful, executing the functional content of the backend module; and
   issuing a new hierarchical public-key certificate for delegating the rights to access a subsequent backend module based on the received hierarchical public-key attribute certificate.

2. A method according to claim 1, wherein the attribute certificate has been issued by the at least one process level activity.

3. A method according to claim 1, wherein the backend module is a first backend module and the first backend module further delegates the rights embedded in the attribute certificate to a second backend module by issuing a second attribute certificate.

4. A method according to claim 3, wherein the first backend module further issues a second attribute certificate, the second attribute certificate being based on the attribute certificate and comprising additional information added by the first backend module representing the fact that the first backend module has been executed, in a non-repudiable way.

5. A method according to claim 4, wherein the first backend module further signs the information representing the fact that the first backend module has been executed with a private key associated with the first backend module.

6. A method according to claim 3, wherein the first backend module further adds actual context information to the attribute certificate as attributes in order to issue the second attribute certificate.

7. A method according to claim 6, wherein the actual context information comprises the time of execution of the first backend module.

8. A method according to claim 3, wherein a backend module of the plurality of backend modules being the last backend module in the predetermined execution path and being able to access the system resources makes a last attribute certificate being the attribute certificate received by the last backend module persistent in an audit log.

9. A device for executing a workflow, comprising:
   system resources and a plurality of backend modules, the backend modules comprising intermediate system components and a last backend module, wherein the workflow comprises process level activities, at least one process level activity being able to access the system resources, the access to the system resources being mediated by the plurality of backend modules, wherein the intermediate system components of the plurality of backend modules each comprise:
   a receiving component for receiving a hierarchical public-key attribute certificate embedding the rights to access the system resource;
   a validating component for validating the attribute certificate;
   a right checking component for checking whether the attribute certificate grants a right to execute a functional content of the backend module;

a path checking component for checking whether a predefined execution path from the process level activity to the backend module has been traversed;

a decision component for deciding whether the results of the right checking component and the path checking component are successful;

an executing component for executing the functional content of the backend module if the results of the right checking component and the path checking component are successful; and an issuing component for issuing a new hierarchical public-key certificate for delegating the rights to access a subsequent backend module based on the received hierarchical public-key attribute certificate.

10. A device according to claim 9, wherein the backend module is a first backend module, the first backend module further comprising a delegating component for delegating the rights embedded in the attribute certificate to a second backend module by issuing a second attribute certificate.

11. A device according to claim 10, wherein the first backend module further comprises an information adding component for adding information to the attribute certificate in order to issue a second attribute certificate, the second attribute certificate being based on the attribute certificate and comprising additional information representing the fact that the first backend module has been executed, in a non-repudiable way.

12. A device according to claim 11, wherein the first backend module further comprises a signing component for signing the information representing the fact that the first backend module has been executed with a private key associated with the first backend module.

13. A device according to claim 10, wherein the first backend module further comprises a context adding component for adding actual context information to the attribute certificate as attributes in order to issue the second certificate.

14. A device according to claim 9, further comprising a last backend module of the plurality of backend modules being the last backend module in the predetermined execution path and being able to access the system resources, the last backend module comprising an audit generating component for making last attribute certificate being the attribute certificate received by the last backend module persistent in an audit log.

15. A non-transitory computer readable storage medium storing a computer program containing computer readable instructions which, when loaded and executed in a suitable computer or computer network environment, perform a method according to claim 1.

* * * * *